United States Patent [19]
Pawlak et al.

[11] 3,873,459
[45] Mar. 25, 1975

[54] ANTIDEGRADANT ADDITIVE FOR ORGANIC WORKING FLUIDS

[75] Inventors: Joseph A. Pawlak, Buffalo; Charles W. West, Niagara Falls; James G. Colson, Williamsville; Francis J. Bajer, Depew, all of N.Y.

[73] Assignee: Hooker Chemical & Plastic Corp., Niagara Falls, N.Y.

[22] Filed: July 2, 1973

[21] Appl. No.: 376,101

Related U.S. Application Data

[63] Continuation-in-part of Ser. No. 319,101, Dec. 27, 1972, which is a continuation-in-part of Ser. No. 155,297, Jan. 21, 1971.

[52] U.S. Cl............... 252/51.5 A, 44/66, 252/392, 252/403
[51] Int. Cl............................................ C10m 1/32
[58] Field of Search............. 252/51.5 A, 392, 403; 44/66, 71

[56] References Cited
UNITED STATES PATENTS 3,377,315   4/1968   Ashton et al. ................. 252/51.5 A
3,767,575  10/1973   Braid ............................ 252/51.5 X Primary Examiner—W. Cannon
Attorney, Agent, or Firm—Peter F. Casella; Donald C. Studley; William J. Crossetta, Jr.

[57] ABSTRACT

A method of inhibiting degradation of organic working fluids and substrates in contact therewith is disclosed which comprises incorporating into said organic working fluids an effective degradation inhibiting amount of a compound of the formula

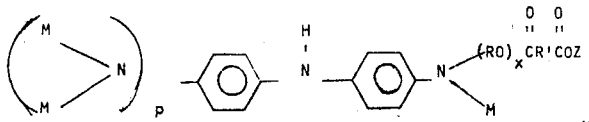

wherein $x$ is an integer from 1–12; Z is a member of the group consisting of H, and alkyl; R is a member selected from the group consisting of ethylene, 1,2-propylene, 1,2-butylene, 2,3-butylene, styrylene and mixtures thereof, R' is selected from the group consisting of alkyl, arylene, alkylene, alkenylene, cycloalkenylene, cycloalkylene moieties and mixtures thereof containing at least two nuclear carbon atoms; M is a member individually selected fro the group consisting of hydrocarbon of 1–18 carbon atoms,

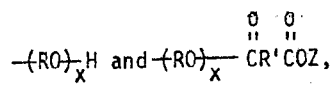

wherein R, $x$, R' and Z are as above defined; and $p$ is an integer from 0–1, providing when p is 0,

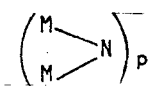

is hydrogen.

22 Claims, No Drawings

ANTIDEGRADANT ADDITIVE FOR ORGANIC WORKING FLUIDS

This application is a continuation-in-part of Ser. No. 319,101, filed Dec. 27, 1972, which is a continuation-in-part of Ser. No. 155,297, filed Jan. 21, 1971.

BACKGROUND OF THE INVENTION

The use of organic anti-degradants is well known and many types of organic compounds have been suggested for use in this connection. They may be ionized compounds such as carbonates, certain benzoates and the like or non-ionized compounds such as aldehydes, amines, thiols, sulfides, thioureas and the like or certain aromatic amines and certain phenols and the like. The patent and technical literature contains voluminuous references to anti-degradants.

The term anti-degradant includes within its meaning properties which inhibit corrosion as well as properties which stabilize or adjust the environment in which it has been applied. Known corrosion inhibitors frequently function primarily to form a protective barrier on the surface of a substrate by physical adsorption, chemisorption or reaction with the substrate. An antidegradant may or may not perform the same function or may mainly stabilize or alter the bulk environment. To illustrate, corrosion problems may manifest themselves in the operation of the every day automobile; by the degradation of lubricating oils and greases and the corrosion of metal bearing surfaces lubricated by such; by the degradation of fuel and the corrosion of fuel receiving combustion chamber walls; by the corrosion of the walls of a combustion by-product transmitting exhaust system; by the failure of a degraded hydraulic system fluid and the corrosion of surfaces in contact therewith; by the degradation of a transmission fluid and the corrosion of surfaces in contact therewith. Working fluids, which includes within its meaning natural and synthetic organic oils, greases and fuels are susceptable to degradation, especially under the severity of conditions which they are utilized. Lubricating oils and greases, liquid fuels, work transmission oils and greases, temperature transmission oils and greases and any of the myriad uses of natural and synthetic oils, fuels and greases impose working conditions which cause degradation to the oil, fuel or grease and/or to the substrate upon which it is in contact.

Inasmuch as losses attributable to degradation amount to billions of dollars annually, much effort is being devoted to the preparation of more efficient anti-degradants. It would be highly desirable to prepare more efficient anti-degradants than those currently available by incorporating some or all of the above properties in one, or a mixture, of compound(s) which may be capable of interacting with the surface of the metal and also be capable of acting as environmental stabilizers or alterers.

BRIEF DESCRIPTION OF THE INVENTION

In accordance with this invention, it has been found that certain acids, esters, suitable salts and acid esters, as well as the corresponding multi-esters, -acids, salts and acid esters of N-oxyalkylenated 4-amino diphenylamines and N-oxyalkylenated 4,4'-diamino diphenylamines, as further defined herein below, when incorporated in working fluids are highly effective additives for protection from degradation of the media and/or against corrosion of metallic substrates caused by the severity of the conditions under which these working organic fluids are utilized. The acids, esters and acid esters, as well as the corresponding multiesters, acids and - acid esters, which comprise the antidegradants of this invention are effective in relatively small amounts, that is in amounts of as little as 0.0015% by weight when dissolved in the working fluid.

DETAILED DESCRIPTION OF THE INVENTION

The present invention discloses an improved method for inhibiting degradation of organic working fluids and substrates in contact therewith by incorporating into the working fluid an effective degradation inhibiting amount of at least one compound of the formula

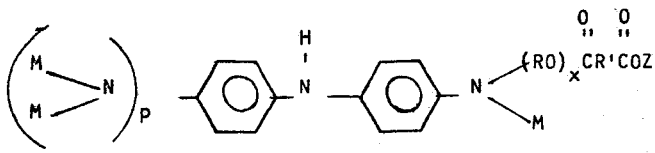

wherein $x$ is an integer from 1–12; Z is a member of the group consisting of —H, and alkyl; R is a member selected from the group consisting of ethylene, 1,2-propylene, 1,2-butylene, 2,3-butylene, styrylene and mixtures thereof, R' is selected from the group consisting of alkyl, arylene, alkylene, alkenylene, cycloalkenylene, cycloalkylene moieties and mixtures thereof containing at least two nuclear carbon atoms, M is a member individually selected from the group consisting of hydrocarbon of 1–18 carbon atoms,

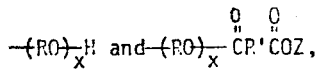

wherein R, $x$, R' and Z are as above defined, and $p$ is an integer from 0–1. providing when $p$ is 0,

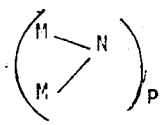

is hydrogen.

The compounds of this invention represent acids, esters and acid esters of N-oxyalkylenated 4-aminodiphenylamines and N-oxyalkylenated 4,4'-diaminodiphenylamines. The amine components of the ester are produced by known techniques such as is disclosed in U.S. Pat. No. 3,330,777. Generally, the 4-aminodiphenylamine or 4,4'-diaminodiphenylamine reactant is oxyalkylenated with ethylene oxide, propylene oxide, 1,2-butylene oxide, 2,3-butylene oxide, styrene oxide or mixtures thereof to introduce at least one hydroxy alkyl group to a free amino group thereby producing a secondary or tertiary amine. With the introduction of a basic catalyst and an additional amount of the alkylene oxide reactant, the chain length of the N-hydroxyalkylated group may be extended to afford an amine derivative containing up to about 12 repeating alkoxy groups with a terminating hydroxyl group.

The N-oxyalkylenated 4-aminodiphenylamine or 4,4'-diaminodiphenylamine intermediate is subsequently esterified with a stoichiometric amount of a carboxylic acid anhydride to afford the half esters of this invention. The performance of the process for reaction of a dicarboxylic acid anhydride with alcohols, of the type involved in the N-oxyalkylenated-4-aminodiphenylamine or 4,4′-diaminodiphenylamine reactants, is by known techniques. The free carboxylic acid group of the acid ester so derived, may be converted to a ester by reacting with a methylating agent such as dimethyl sulfate, or by reacting with diazomethane or by the introduction of a monofunctional alcohol such as methanol, ethanol, propanol, butyl alcohol, amyl alcohol, lauryl alcohol or stearyl alcohol, or a lower alkylene oxide carbonate and the like. A preferred mode of the invention is when Z is alkyl of 1–20 carbon atoms. Of the carboxylic acid anthydrides employed in the production of the compounds of the instant invention, those of special interest include the anhydrides produced by the Diels-Alder condensation of maleic anhydride and rosin, phthalic anhydride, maleic anhydride, succinic anhydride, itaconic anhydride, camphoric anhydride, citraconic anhydride, cyclohexane 1,2-dicarboxylic anhydride, cyclohex-4-ene 1,2dicarboxylic anhydride, 3,4,5,6-tetrachlorophthalic anhydride, cyclopentane 1,2-dicarboxylic anhydride, the anhydride of 1,2,3,4-benzene tetracarboxylic acid, the anhydride of benzene hexacarboxylic acid, trimellitic anhydride, chlorendic anhydride, anhydride products of terpenic like compounds with maleic anhydride, such as β-pinene, dipentene, α-terpinolene and the like; alkyl and alkenyl substituted succinic anhydrides and the like.

The following examples are presented to illustrate preferred embodiments of the invention without however any intent to limit this invention.

EXAMPLE 1

N,N-dihydroxyethyl-N′-phenyl-para-phenylenediamine

Fifty pounds of para aminodiphenylamine were charged to a reactor and heated to 142°C, with 23 inches of mercury vacuum on the reactor. The reactor was then sealed and 27 pounds of ethylene oxide were fed to the reactor over a period of 52 minutes at a reaction temperature of 142–172°C. at a rate of moderate pressure buildup. The reaction was exothermic and cooling was required to hold the temperature in the desired range. The reaction mixture was allowed to stir for an additional 19 minutes. The final product, after cooling, was a dark colored solid exhibiting hydroxyl number of 470, a molecular weight of (Mn) of 286, a nil primary amine content, a secondary amine content of 0.34 milliequivalents per gram of sample and a tertiary amine content of 3.38 milliequivalents per gram of sample.

EXAMPLE 2

N,N-diphydroxyethyl-N′-phenyl-para-phenylenediamine 552.6 grams by weight of para-aminodiphenylamine were charged to a 2-liter flask equipped with a mechanical stirrer, gas inlet tube for subsurface additions, a thermometer and a capillary tube immersed in an oil bath as a venting device on the exit side of the flask. The amine was heated to 133°C. and 293.6 grams of ethylene oxide were then added over a period of 1 hour and 10 minutes at a reaction temperature of 133°–174°C. and at a rate to avoid excessive bubbling. Cooling was required to hold the temperature in the desired range. The final cooled product was a dark colored solid which exhibited a hydroxyl number of 495, a molecular weight (Mn) of 287, a nil primary amine content, a secondary amine content of 0.17 milliequivalents per gram of sample and a tertiary amine content of 3.35 milliequivalents per gram of sample.

EXAMPLE 3

N,N-dihydroxypropyl-N′-phenyl-para-phenylenediamine 552.6 grams of para-aminodiphenylamine were charged to a 2-liter flask equipped with a pressure equalized dropping funnel, nitrogen gas inlet, mechanical agitator, thermometer with a thermowatch and a five bulb water cooled condenser. The para-aminodiphenylamine was heated to 168°C. under a nitrogen gas atmosphere and 357.2 grams of propylene oxide were added over a period of 7 hours at a rate to avoid excessive refluxing. The reaction mixture was allowed to stir for an additional 58 minutes. The final cooled product was a dark solid exhibiting a hydroxyl number of 423, a nil primary amine content, a secondary amine content of 0.22 milliequivalents per gram of sample, a tertiary amine content of 3.23 milliequivalents per gram of sample and a molecular weight (Mn) of 308.

EXAMPLE 4

N,N-dihydroxypropoxypropyl-N′-phenyl-para-phenylenediamine

Following the procedure of Example 3, 552.6 grams of para-aminodiphenylamine were reacted with 697 grams of propylene oxide in the presence of 2.8 grams of anhydrous sodium acetate. The reaction product was worked up essentially in the same manner as that of Example 3. The final cooled material was a very highly viscous liquid possessing a hydroxyl number of 334, a molecular weight (Mn) of 397, a nil primary amine content, a secondary amine content of 0.36 milliequivalents per gram of sample and a tertiary amine content of 2.57 milliequivalents per gram of sample.

EXAMPLE 5

Half Ester of Gum Rosin - Maleic Anhydride Adduct and
N,N-dihydroxyethyl-N′-phenyl-para-phenylenediamine 76.9 pounds of gum rosin were charged to a reactor and heated under a nitrogen atmosphere to 131°C. 24.9 pounds of maleic anhydride were added in four parts over a period of 35 minutes to control the reaction exotherm. The temperature of the reaction mixtures rose to 187°C. after the second addition and was controlled by cooling. The reaction mixture was held between 180°–188°C after the maleic anhydride addition for 2 hours. 28.1 pounds of N,N-dihydroxyethyl-N′-phenyl-para-phenylenediamine prepared by procedure of Example 1, but exhibiting a nil primary content, a secondary amine content of 1.16 milliequivalents per gram of sample, a tertiary amine content of 2.64 milliequivalents per gram of sample, a hydroxyl number of 489 and a molecular weight (Mn) of 263 were added to three portions. No exotherm was observed. The reaction mixture was held between 174–182°C. for 1 hour at which time the mixture was discharged from the reactor. The product had an acid number of 226 (theory=219.7) and melted at 110°–124° C.

EXAMPLE 6

Acid Phthalate of
N,N-dihydroxyethyl-N'-phenyl-para-phenylenediamine 77 pounds of the oxyethylated para-aminodiphenylamine of Example 1 at a temperature of 150°C and under a nitrogen gas atmosphere were reacted with 95.5 pounds of phthalic anhydride in a suitable reactor. The phthalic anhydride was added in four parts over a 33 minute period to keep temperature fluctuations at a minimum. The reaction mixture was allowed to stir for 1 hour and 47 minutes at temperature of 140°–165°C at which time the mixture was discharged from the reactor. The final product exhibited an acid number of 207 (theory=209.7) and melted at 96.4°–104°C.

EXAMPLE 7

Acid Phthalate of
N,N-dihydroxypropyl-N'-phenyl-para-phenylenediamine 265.2 grams (2 hydroxy equivalents) of the product of Example 3 were weighed into a 1 liter, 3-necked flask and heated under nitrogen atmosphere to 146°C. 296.2 grams (2 moles) of phthalic anhydride were added slowly to the reaction vessel at a temperature of 141°–146°C. The reaction mixture was then held at 141°–155°C for an additional hour at which time it was discharged. The final product had an acid number of 195.9–203.7 (Theory=199.9) and melted at 112°–119°C.

EXAMPLE 8

Acid Phthalate of
N,N-dihydroxypropoxypropyl-N'-phenyl-para-phenylenediamine

Into a 1 liter flask were placed 335.9 grams (2 hydroxyl equivalents) of the oxypropylated para aminodiphenylamine of Example 4. 296.2 grams (2 moles) of phthalic anhydride were introduced into the reaction vessel and the reaction was conducted in the same manner as that presented in Example 7. The final product had an acid number of 184.5 (Theory=177.5) and melted at 103°–106°C.

EXAMPLE 9

Acid Succinate of
N,N-dihydroxyethyl-N'-phenyl-para-phenylenediamine

Into a 500 milliliter 3-necked flask equipped with a nitrogen inlet tube, glass stirrer, thermometer and a five bulb condenser, were weighed, 113.3 grams (1.00 hydroxyl equivalent) of N,N-dihydroxyethylpara aminodiphenylamine product of Example 2 and 100.1 grams (1.00 mole) of succinic anhydride. The reaction was conducted under a nitrogen blanket with agitation of the reaction mixture. The total reaction time was 1 hour and 49 minutes at temperatures of 142.7°–163.0°C. The final product had an acid number of 259.7 (Theory=262.9) and melted at 44°–54°C.

EXAMPLES 10 and 11

Acid Esters of Hexahydrophthalic Anhydride and $\Delta^4$-Tetrahydrophthalic Anhydride.

Additional acid esters of the N,N-(hydroxyethyl) para-aminodiphenylamine product of Example 2 were prepared in accordance to procedures set forth in the preceding example. The reagents, proportions and characteristics of the resulting products are set forth in Table 1.

TABLE 1

|  | Example 10 | Example 11 |
|---|---|---|
| Product of Example 2, parts/weight | 113.3 | 56.6 |
| Hexahydrophthalic anhydride,, parts/weight | 154.2 | — |
| $\Delta^4$-Tetrahydrophthalic anhydride, parts/weight | — | 76.0 |
| Acid number - Theory | 209.7 | 211.3 |
| - Found | 241.8 | 233 |
| m.p. °C. | 68–77 | 75—83 |
| Reaction time | 1 hour 46 mins. | 1 hour 48 mins. |
| Reaction temperature °C | 147–168.8 | 145.1–172.2 |

EXAMPLE 12

Acid Chlorendate of
N,N-dihydroxyethyl-N'-phenyl-para-phenylenediamine

Into a one liter, 3-necked flask were charged 28.3 grams (0.25 equivalents of OH) of the product of Example 2 and 92.7 grams (0.25 moles) of 1,4,5,6,7,7-hexachiorobicyclo [2.2.1]-5-heptene-2,3-dicarboxylic anhydride. To the reaction mixture was added 250 milliliters of chemically pure acetone. Under a nitrogen blanket and agitation, the reaction was conducted at reflux temperature for 4 hours and 5 minutes. The acetone solvent was removed by vacuum distillation. The final product exhibited an acid number of 137.6 (Theory=115.9), melted with decomposition from 136° to 152°C, darkening at 136°–148°C and melting with foaming at 148°–152°C.

EXAMPLE 13

Acid 3,4,5,6-Tetrachlorophthalate of
N,N-dihydroxyethyl-N'phenylpara-Phenylenediamine Following the procedure set forth in the preceding example, 28.3 grams (0.25 equivalents of hydroxyl groups) of the product of Example 2 and 71.5 grams (0.25 moles) of 3,4,5,6-tetrachlorophthalic anhydride were dissolved in 500 milliliters of acetone. The reaction mixture was refluxed 4 hours. The product was precipitated by adding the acetone solution to an excess of distilled water. The product was filtered and dried. The acid number of the product was 185.8 (Theory=140.5). The melting point was 131°-139°C.

EXAMPLE 14

Acid Maleate of N,N-dihydroxypropoxypropyl-N'-phenyl-paraPhenylenediamine 168.0 Grams (1.0 equivalents of hydroxyl groups) of the oxypropylated para-aminodiphenylamine of Example 4 and 98.1 grams (1.0 mole) of maleic anhydride were charged into a 500 milliliter, 3-necked flask equipped with a nitrogen gas inlet tube, glass stirrer, thermometer with a thermowatch and a five bulb water cooled condenser. The reaction mixture was heated to 151 C and held for 1 hour at 148°-155°C. The final product melted at 81°-93°C.

EXAMPLE 15

2-Hydroxyethyl Esters of Example 5

A 3-necked flask, equipped with a nitrogen inlet, stirrer, thermometer, and five bulb condenser, containing 300 grams of the product from Example 5 (1.24 carboxyl equivalents), 3.0 grams potassium carbonate, and 108.7 grams (1.24 moles) of ethylene carbonate were heated to 165°C. This mixture was held at 127°-133°C for 3.5 hours. The solid product (m.p. 71°-82°C) exhibited a nil acid number.

EXAMPLE 16

2-Hydroxyethyl Esters of Example 6

A 3-necked flask equipped as in Example 16, containing 274 grams (1.0 carboxyl equivalent) of the product from Example 6, 2.7 grams potassium carbonate, and 88.1 gram (1 mole) ethylene carbonate were heated at 165°-168°C for 3 hours and 40 minutes. The solid product melted at 55°-67°C. and had a nil acid number.

EXAMPLE 17

Preparation of Methyl Esters

Methyl esters of the acids cited in earlier examples can be prepared by standard methods. One particularily easy method is as follows:

Take 0.1-0.2 parts of acid to be esterified and dissolve in a 1/1 methanol-ether mixture. Add an ethereal diazomethane solution, prepared by slowly adding 20 grams of N-methyl-N'-nitro-N-nitrosoguanidine to a 1 liter Erlenmeyer flask containing 400 milliliters of 20 percent KOH and 400 milliliters of chilled ether, slowly until a permanent diazomethane color persists. Let the solution set 10-15 minutes. The solvent is removed with a gentle stream of nitrogen leaving the desired methyl ester.

EXAMPLE 18

Acid Maleate of N,N-dihydroxyethyl-N'-phenyl-para-phenylenediamine

A mixture of 100 grams (0.681 hydroxyl equivalents) of N,N-dihydroxyethyl-N'-phenyl-para-phenylenediamine and 66.8 grams of maleic anhydride (0.681 moles) were heated under a nitrogen blanket to about 110°-120°C. for a period of approximately 1.5 hours. The product exhibited a melting point of 90°-92°C. and an acid number of 205.7 (229.0 theory).

EXAMPLE 19

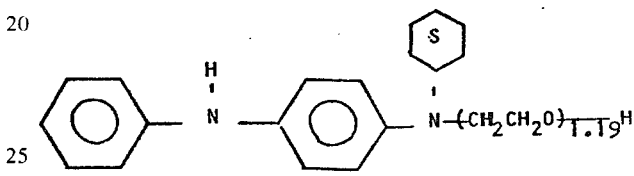

476.7 grams by weight of N-phenyl-N'-cyclohexyl-p-phenylenediamine was charged, under vacuum, to a 1 liter pressure reactor and heated to 100°C. The reactor was sealed and the amine was further heated to 156°C with agitation. 94 grams by weight of ethylene oxide was added over an 18 minute period at a reaction temperature of 146°-156°C and reaction pressures of up to 102 psig. The reaction mixture was then allowed to stir for an additional 2 hours and 14 minutes at 146°-156°C. until the pressure gauge indicated zero pressure. The final product, after cooling, was a dark very thick paste exhibiting a nil primary and secondary amine content and a tertiary amine level of 2.88 milliequivalents per gram of sample.

EXAMPLE 20

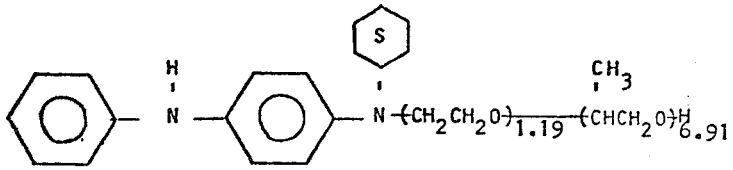

343.5 grams of the oxyethylated N-phenyl-N'-cyclohexyl-p-phenylenediamine product of Example 19 and 3.4 grams of sodium acetate were charged to a 1 liter flask equipped with a 500 milliliter pressure equalized dropping funnel, nitrogen gas inlet, mechanical agitator, thermometer with thermowatch and dual water cooled condensers. Air cooling actuated by a solenoid valve attached to the thermowatch was used to maintain temperatures below 180°C. The amine was initially heated to 172°C., under a nitrogen gas atmosphere, and 433.7 grams by weight of propylene oxide were added over a period of 10 hours and 10 minutes to avoid excessive refluxing. The final product, after cooling, was a dark liquid exhibiting a nil primary and secondary amlne content and a tertiary amine content of 1.36 milliequivalents per gram of sample.

EXAMPLE 21

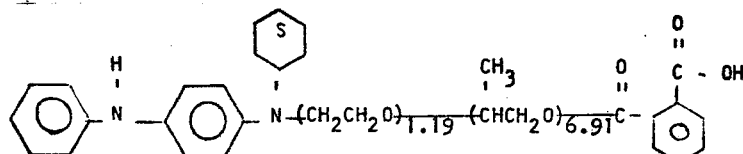

108.0 grams by weight of the oxyalkylated N-phenyl-N'-cyclohexyl-p-phenylenediamine of Example 20 and 22.2 grams by weight of phthalic anhydride were charged into a suitable reactor (a one liter flask as equipped in Example 20) and heated under a nitrogen blanket to 147°C. The reaction mixture was maintained at 147°-151°C for 1 hour and 35 minutes. The final product, after cooling, was a viscous liquid and had an acid number of 63.1.

EXAMPLE 22

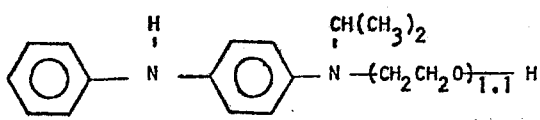

410.0 grams of N-isopropyl-N'-phenyl-p-phenylenediamine was charged to a one liter pressure reactor and, using the procedure of Example 19, 88 grams of ethylene oxide was added thereto over a period of 11 minutes at a temperature of 141°-156°C. and pressure of up to 79 psig. The reaction mixture was maintained at 146°-155°C., with agitation, for an additional 92 minutes until the pressure gauge indicated a zero pressure. The product, after cooling, was a dark viscous liquid which showed signs of crystallization or partial solidification after a prolonged storage (>5 months). Analysis of the product indicated a nil primary amine content, 0.20 milliequivalents per gram of sample of secondary amine and 0b 3.31 milliequivalents per gram of sample of tertiary amine.

EXAMPLE 23

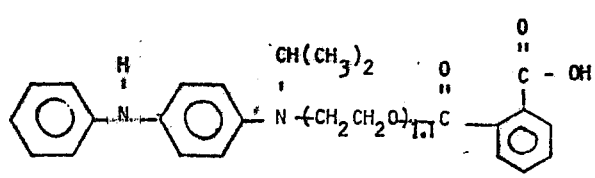

82.4 grams of the product of Example 22 and 44.4 grams of phthalic amhydride were charged to a one liter flask as described in Example 14 and heated to 147°C. under a nitrogen atmosphere. The reaction mixture was maintained at a temperature of 141°-149°C. for a total of 66 minutes. The product, after cooling, was a dark solid melting at 78°-88°C. and exhibited an acid number of 123.1

EXAMPLE 24

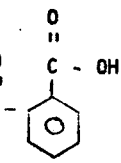

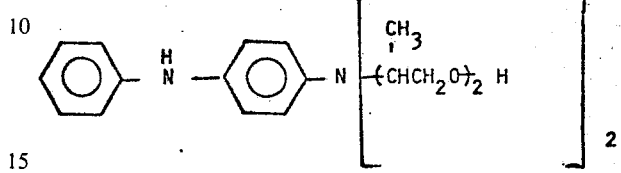

8105 grams of p-aminodiphenylamine was charged to a reactor and heated to 101°C under a vacuum of 29 inches of mercury. The reactor was then sealed and 11.3 pounds of propylene oxide were fed to the reactor over a 2 hour and 38 minute period at temperatures up to 146.2°C and pressures up to 18 psig. The reaction mixture was thereafter stirred for an additional 17 minutes during which time the pressure in the reactor dropped to zero psig. The reactor was opened and 40.5 grams of anhydrous sodium acetate was added. The reactor was sealed under 24 inches of mercury vacuum and an additional 11.3 pounds of propylene oxide was fed thereto over a 2 hour and 4 minute period at temperatures of 148.8°-157.5°C. and pressures up to 23 psig. An additional 12 minute stirring period was required to digest the propylene oxide to 0 psig.

The final product was a dark liquid whose viscosity was found to be 26,600 poises at 25.7°C. The weight per gallon of this material was 9.03 pounds, the primary amine content was nil, the secondary amine content was found to be 0.16 milliequivalents per gram of sample while the tertiary amine content was found to be 2.32 milliequivalents per gram of sample. The final product contained 4 moles of propylene oxide per mole of p-aminodiphenylamine.

EXAMPLE 25

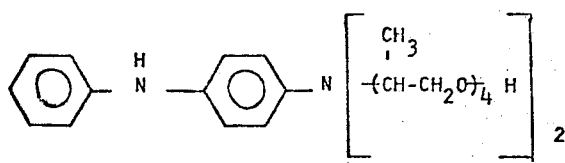

p-aminodiphenylamine was oxypropylated by the procedure of Example 24 to yield a material containing 8 moles of propylene oxide per mole of the amine. The final product showed a nil primary amine content, a secondary amine level of 0.11 milliequivalents per gram of sample and a tertiary amine content of 1.48 milliequivalents per gram of sample. The final product exhibited a viscosity at 25.1°C. of 179.6 poises and a weight per gallon of 8.82 pounds.

EXAMPLE 26

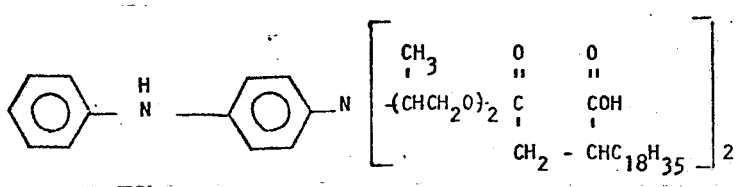

208.4 grams of the product of Example 24 and 350.7 grams of isooctadecenylsuccinic anhydride were charged to a suitable reactor and heated under a nitrogen atmosphere to 150°C. The reaction mixture was held at 147°–150°C. for a period of 76 minutes. The final product, after cooling, was a dark viscous liquid having an acid number of 97.2

EXAMPLE 27

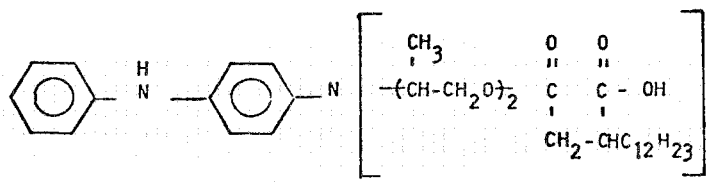

208.3 grams of the product of Example 24 and 266.3 grams of dodecenylsuccinic anhydride were heated together in a suitable reactor under a nitrogen atmosphere to 151.7°C. The reaction mixture was held for 61 minutes at 148.8°–151.7°C. The final product, after cooling, was a dark low melting solid with an acid number of 116.2.

EXAMPLE 28

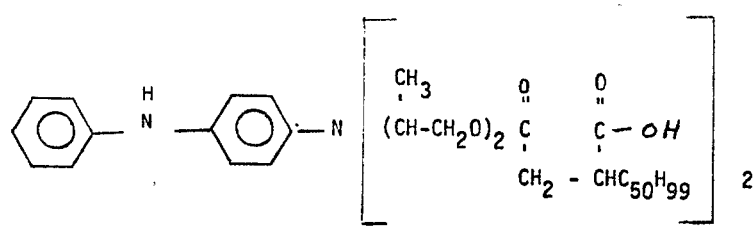

52.1 grams of the product of Example 24 and 276.1 grams of a C50 alkyl substituted succinic anhydride were heated together in a suitable reactor under a nitrogen atmosphere to 147°C and held at 147°–148.1°C for a period of 63 minutes. The product, after cooling, was a dark, viscous liquid with an acid number of 35.7.

EXAMPLE 29

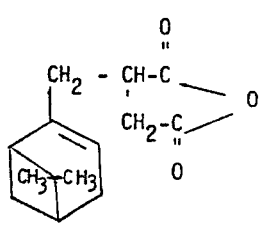

98.1 grams of maleic anhydride and 141.9 grams of β-pinene (96% pure) were charged to a suitable reactor and heated under a nitrogen atmosphere to 146.8°C. The reaction was exothermic and some cooling was necessary. The reaction mixture was held at 143.8°–146.8°C. for a 1½ hour period. The mixture was then heated to 199.5°C and held for an additional 1½ hour period at 197°–202°C. The product, after cooling, was a waxy solid which contained about 1% unreacted maleic anhydride by NMR analysis. The acid number of the product was 483.2 and the molecular weight was found to be 245.

EXAMPLE 30

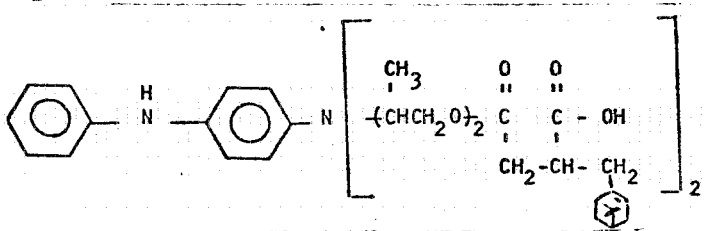

471.5 grams of product, prepared as described in Example 29, was heated in a suitable reactor under a nitrogen atmosphere to 116.7°C. 409.7 grams of the product of Example 24 was charged to a pressure equalized, heated, dropping funnel and heated to 115°–125°C., then added to the reactor over a 10 minute period. The reaction was exothermic and cooling was necessary to maintain a temperature below 129°C. The reaction mixture was then held for 6 hours at 121.5°–128°C. The product, after cooling, was a dark solid, melting between 68 and 78°C., and exhibited an acid number of 121.0. The molecular weight of this material was found to be 862.

EXAMPLE 31

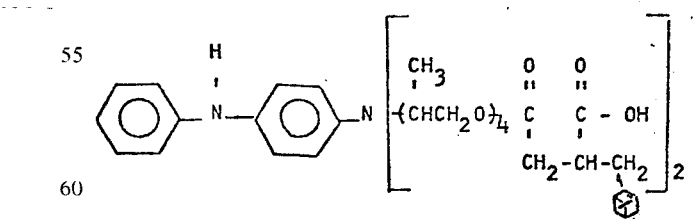

333.0 grams of a product prepared by the procedure of Example 29 was reacted with 450.3 grams of the product of Example 25 at 122°–129°C. under a nitrogen atmosphere for 3 hours. The product, after cooling, was an extremely viscous liquid and exhibited an acid number of 100.7.

EXAMPLE 32

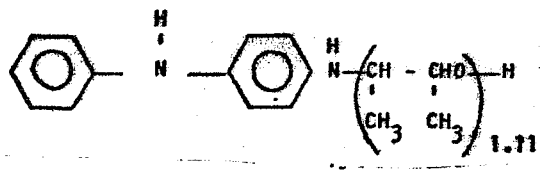

184.2 grams of paraaminodiphenylamine was charged to a 500 milliliter flask equipped with a gas inlet tube, a pressure equalized addition funnel, a mechanical agitator, a thermometer with a thermowatch and a water cooled condenser. The amine was heated to 104°C. and 11.5 grams of hydrogen chloride gas were added over a 13 minute period. The reaction was exothermic and the temperature rose to 165.2°C. 79.9 grams of 2,3-butylene oxide was added to the reaction mixture over a 19 minute period. Refluxing resulted and the temperature dropped from 113.2°C. at the start of the addition, to 78.5°C. at the end of the addition. Heating was continued for approximately 14 hours until refluxing had ceased. 33.9 grams of anhydrous sodium carbonate were added at 124°C, refluxing resumed, and the reaction mixture was heated for approximately 11 hours. The final product was filtered (hot) through a glass fritted funnel. Amine analysis of the final product gave the following:

| Total Amine | - Calc. | = 3.70 | milliequivalents per gram of sample |
| --- | --- | --- | --- |
| | - Found | = 3.69 | " |
| Primary Amine | | = 0.70 | " |
| Secondary Amine | | = 2.84 | " |
| Tertiary Amine | | = 0.15 | " |

EXAMPLE 33

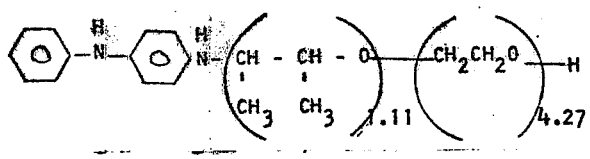

98.5 grams of the product of Example 32 was charged to a suitable reactor and heated to 165°C. under a nitrogen atmosphere. 0.74 grams of sodium methylate was added thereto. 70.2 grams of ethylene oxide was then added subsurface to the reaction mixture over a period of 41 minutes at temperatures of 159°–180.5°C. The final product exhibited the following amine analysis.

| Total Amine | - Calculated | = 2.16 | milliequivalents per gram of sample |
| --- | --- | --- | --- |
| | - Found | = 2.13 | " |
| Primary Amine | | = 0.08 | " |
| Secondary Amine | | = 1.46 | " |
| Tertiary Amine | | = 0.59 | " |

EXAMPLE 34

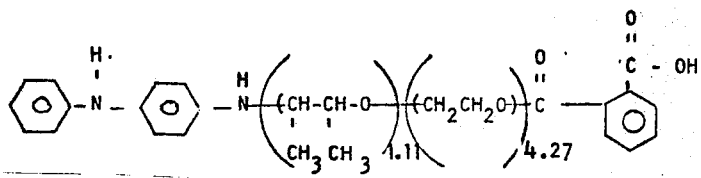

90.4 grams of the product of Example 33 and 29.6 grams of phthalic anhydride were reacted as shown in Example 23. The final product, after cooling was a dark solid having an acid number of 93.5.

EXAMPLE 35

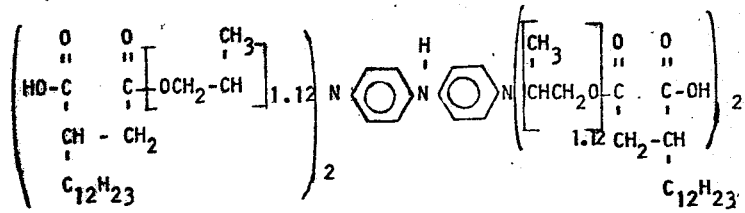

99.6 grams of 4,4'-diaminodiphenylamine was charged to a suitable reactor and heated under a nitrogen atmosphere to 170°C. 130.2 grams of propylene oxide were added to the amine over a 5¾ hour period at 148°–179°C. Some refluxing of the oxide occurred during the addition. 57.4 grams of the resulting oxypropylated 4,4'-diaminodiphenylamine and 133.0 grams of dedecenylsuccinic anhydride were then charged to a suitable reactor and heated to 150°C., for 1 hour, under a nitrogen atmosphere with agitation. The final product, after cooling, was a dark solid, melting in a range of 94°–104°C, having an acid number of 128.2.

EXAMPLE 36

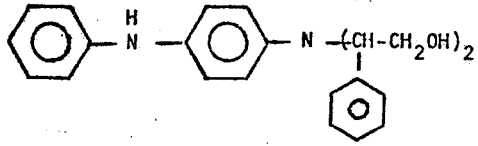

184.2 grams of para aminodiphenylamine is charged to a suitable reactor and heated to 175°–180°C under a nitrogen atmosphere. 240.3 grams of styrene oxide is added so as to prevent excessive refluxing. The mixture is then heated at 175°–180°C. until all of the oxide has reacted as evidenced by cessation of the reflux. The final product has a total amine value of 2.36 milliequivalents per gram of sample.

EXAMPLE 37

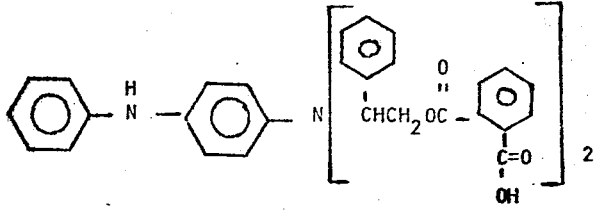

296.2 grams of phthalic anhydride is reacted with 424.5 grams of the product of Example 36 in the manner of Example 12. The product exhibits an acid number of 155.7.

EXAMPLE 38

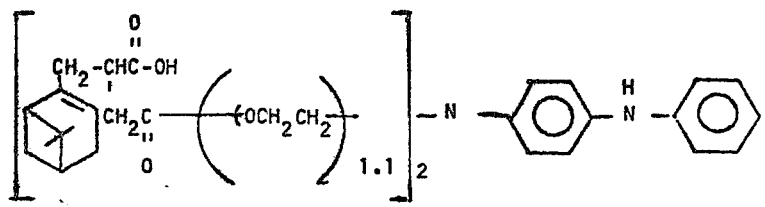

282.6 grams of β-pinene (96% pure) was charged to a suitable reactor and heated under a nitrogen atmosphere to 140°C. 196 grams of ground maleic anhydride was added to the reactor over a 3 minute period. The reaction was exothermic and the temperature rose to 158°C. The reaction mixture was held for 4¾ hours at temperatures of 145°–158°C. NMR analysis of the reaction mixture showed the unreacted maleic anhydride level at 5.4%. 268.7 grams of molten oxyethylated para aminodiphenylamine, prepared by process described in Example 1, was added to the reaction mixture at a temperature of about 100°C. The molten amine was added as quickly as it could be poured. The reaction was exothermic and the temperature rose to 156°C. within 2 minutes. The final product, after cooling, was a dark solid, melting in the 60°–70°C. range, and exhibited an acid number of 134.9

EXAMPLE 39

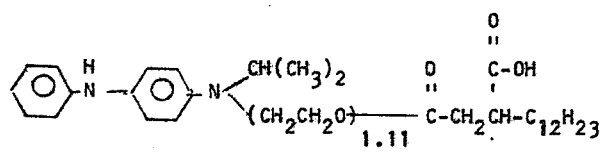

135.0 grams of N-isopropyl-N'-phenyl-p-phenylenediamine, which has been ethoxylated by the method of Example 22, and 128.5 grams of tetrapropenylsuccinic anhydride were charged to a 500 milliliter flask equipped as described in Example 14. The condenser was not water cooled. The reaction mixture was heated to 133°–140.8°C for approximately 63 minutes under a nitrogen atmosphere. The final product, a solid, exhibited an acid number of 97.0 (Theory=104.5) and melted in a 45°–55°C. range.

EXAMPLE 40

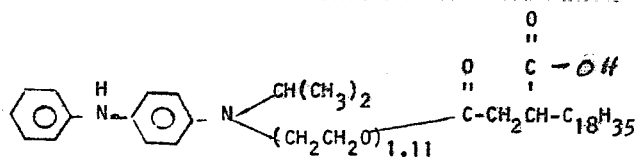

137.6 grams of N-isopropyl-N'-phenyl-p-phenylenediamine, which had been ethoxylated by the method of Example 22, and 175.2 grams of isooctadecenylsuccinic anhydride were charged to a 500 milliliter flask equipped as described in Example 39 and heated to 134°–135°C, for 1 hour, under a nitrogen atmosphere. The final product, a viscous liquid (approx. 29,800 poises at 24°C) exhibited an acid number of 87.8 (Theory=89.7).

EXAMPLE 41

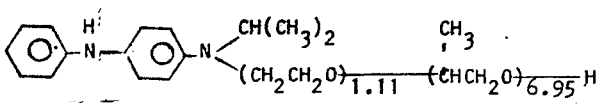

137.8 grams of N-isopropyl-N'-phenyl-p-phenylenediamine, which had been ethoxylated by the method of Example 22, and 1.4 grams of sodium methoxide were charged to a one liter reaction flask, equipped with a 500 milliliter pressure equalized dropping funnel, nitrogen gas inlet, mechanical agitator, thermometer with thermowatch and dual water cooled condensers. The ethoxylated amine was initially heated to 175°C under a nitrogen atmosphere. 218.2 grams of propylene oxide were charged to the pressure equalized funnel. The oxide was added, over approximately a 7 hour period, at such a rate as to prevent excessive refluxing of the oxide at **°–178°C. The reaction vessel was weighed after the oxide addition was completed and it was found that 202.2 g. of propylene oxide had reacted with the amine. The final product was a liquid with a viscosity of 32.4 poises at 23°C.

EXAMPLE 42

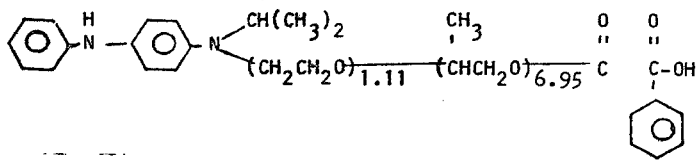

135.8 grams of the product, prepared in Example 41, and 29.6 grams of phthalic anhydride were charged to a 250 milliliter flask, equipped as in Example 39, and heated under a nitrogen atmosphere to 149.5°C. The reaction mixture was held at 148°–149.5°C for 62 minutes. The final product, a viscous liquid (13,600 poises at 23.5°C), exhibited an acid number of 68.2 (Theory=67.8).

EXAMPLE 43

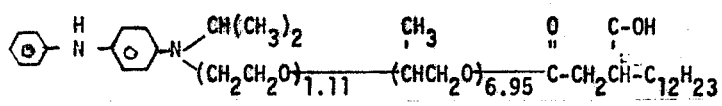

135.8 grams of the product of Example 41 and 52.4 grams of tetrapropenylsuccinic anhydride were reacted together for 1 hour at 134°-136°C under a nitrogen atmosphere in a suitable reactor. The final product, a viscous liquid (1830 poises at 23.5°C) exhibited an acid number of 65.2 (Theory=59.6).

EXAMPLE 44

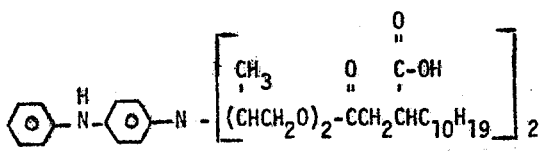

208.3 grams of product prepared by the process of Example 24, with the exception that it was prepared in a flask at atmospheric pressure, and 236.5 grams of N-decenyl succinic anhydride were heated together in a suitable reactor, under nitrogen, to about 146°C. The reaction mixture was held for 118 minutes at 145°-146°C and the final product exhibited an acid number of 119.9 with a viscosity of 55,400 poises at 23.2°C.

EXAMPLE 45

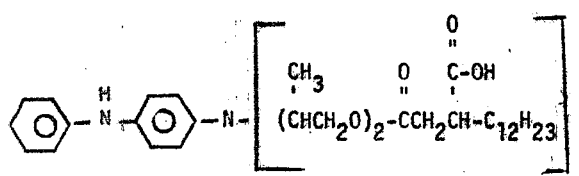

208.3 grams of product prepared by the process of Example 24, with the exception that it was prepared in a flask at atmospheric pressure, and 262 grams of N-dodecenyl succinic anhydride were heated together in a suitable reactor, under nitrogen, to about 146° centigrade. The reaction mixture was held for 115 minutes at about 144.8°-146°C and the final product exhibited an acid number of 122.2 with a viscosity of 4,770 poises at 80°C.

EXAMPLE 46

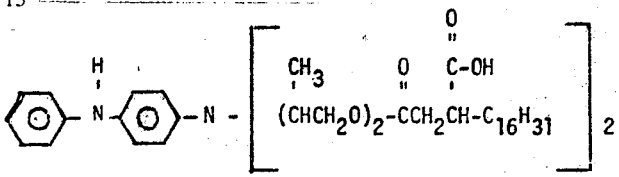

203.3 grams of product prepared by the process of Example 24, with the exception that it was prepared in a flask at atmospheric pressure, and 320.5 grams of N-hexadecenyl succinic anhydride were maintained about 143°-145°C for forming, under nitrogen. The final product exhibited an acid number of 105.7 and a viscosity of 4,190 poises at 23.8°C.

EXAMPLE 47

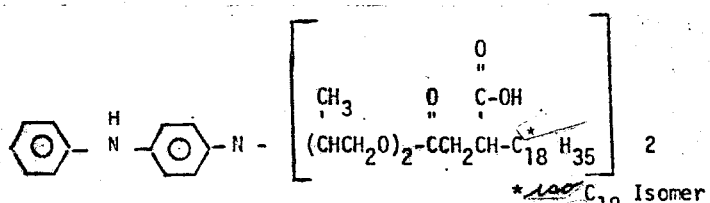

208.3 grams of product prepared by the process of Example 24, with the exception of Example 46, and 346.8 grams of isooctadecenyl succinic anhydride were maintained at about 144°-146.5°C for 68 minutes under nitrogen. The final exhibited an acid number of 100.8 and viscosity of 15,800 poises at 23.8°C.

EXAMPLE 48

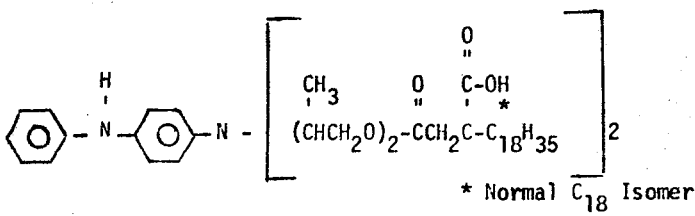

208.3 grams of product prepared by the process of Example 24, with the exception of Example 46, and 347.8 grams of N-octadecenyl succinic anhydride were maintained at about 144.8°-145°C for 127 minutes, under nitrogen. The final product exhibited an acid number of 100.8 and viscosity of 33,600 poises at 23.5°C.

EXAMPLE 49

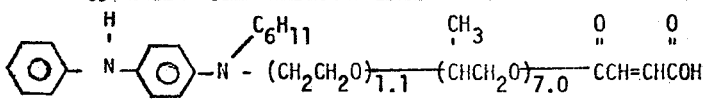

336.4 grams of product prepared by the process of Example 20 and 45.7 grams of maleic anhydride were maintained at about 99°–100°C for 1 hour. The final product exhibited an acid number of 65.8 and viscosity of 7,140 poises at 24°C.

EXAMPLE 50

Antidegradant studies were carried out by incorporating samples of the exemplified compounds into an unstabilized lube oil to form a test sample and testing for corrosion inhibiting properties under the procedure of Federal test 5311, Jan. 15, 1969 (Static Water Drop test). Therein, three polished and cleaned triangular cold-rolled sheet steel plates, having a 7/64 inch dimple centrally located thereon, are fully immersed in three 100 ml low-form pyrex beakers, containing 20 ml of the above prepared test samples, dimple side up. The test sample plate containing beakers are then oven heated for one hour at 60°±2° centigrade. A 0.2 ml drop of distilled water is then dispersed into each dimple of the steel plates and the samples are maintained at 60°±2° centigrade, the time at which a rust spot appears is recorded and the test is discontinued at 168 hours. The unstabilized lube oil utilized in the test was a mid-continent base unstabilized, natural, paraffin base oil. Concentrations of 1.0%, 0.1% and 0.05% by weight of Example 28 additive were tested and no rusting occured over a one week period of time, while the non-additive containing control rusted in one hour. Additive concentration of 0.05%, 0.025% and 0.01% were tested with results as indicated in Table III.

TABLE III

| Additive | % By Wt. | 1 hr. | 3 Days | 1 Week |
|---|---|---|---|---|
| None | 0.0 | All rusted | All rusted | All rusted |
| Prod. of Ex. 26 | 0.05 | No rust | 1 of 3 rusted | 2 of 3 rusted |
| " | 0.025 | No rust | 1 of 3 rusted | 1 of 3 rusted |
| " | 0.01 | No rust | All rusted | All rusted |
| Prod. of Ex. 28 | 0.05 | No rust | No rust | No rust |
| " | 0.025 | No rust | 2 of 3 rusted | 2 of 3 rusted |
| " | 0.01 | No rust | All rusted | All rusted |

EXAMPLE 51

Using the process of Example 50, various of the additive compounds hereinbefore prepared were tested for antidegradant properties in a synthetic lubricant, bis(2-ethylhexyl) sebacate. The results are as indicated in Table IV.

TABLE IV

| Additive | % By Wt. | 1 hr. | 19 hrs. | 27 hrs. | 190 hrs. |
|---|---|---|---|---|---|
| None | | All rusted | — | — | — |
| Prod. of Ex. 39 | | None rusted | None rusted | None rusted | 2 of 3 rusted |
| Prod. of Ex. 44 | | None rusted | None rusted | None rusted | None rusted |
| Prod. of Ex. 45 | | None rusted | None rusted | None rusted | None rusted |
| Prod. of Ex. 46 | | 1 of 3 rusting | 1 of 3 rusting | 1 of 3 rusting | 1 of 3 rusting |
| Prod. of Ex. 47 | | None rusted | None rusted | None rusted | None rusted |
| Prod. of Ex. 48 | | 1 of 3 rusted | 1 of 3 rusted | 1 of 3 rusted | 1 of 3 rusted |
| Prod. of Ex. 49 | | None rusted | All rusted | All rusted | All rusted |

EXAMPLE 52

The product of Example 26, was evaluated to determine its comparative effect as an additive to internal combustion engine crankcase oil. A mid-continent base stock was used as an uninhibited engine crankcase oil and the following test batches prepared:

Batch 1 - base oil without additive (control)

Batch 2 - base oil + 1% by weight product of Example 26

Batch 3 - base oil + 2% by weight product of Example 26

Batch 4 - base oil + 1% by weight zinc dialkyl dithiophosphate (commercial inhibitor)

A. Test samples were taken from each of the above batches and subjected to relatively severe conditions to determine the change in viscosity wrought thereby. Two test samples from each batch were first tested for viscosity then heated to 200° centigrade and air passed therethrough at a rate of 15 liters per hour for two, 6 hour periods. The samples were allowed to stand for about 15–30 hours and the viscosity again measured. The results are in Table V.

TABLE V

| Batch | Sample | Initial * Viscosity | Terminal * Viscosity | % Increase |
|---|---|---|---|---|
| 1 | A | 180.0 | 258.1 | 30.25 |
| 1 | B | 180.0 | 260.0 | 30.76 |
| 2 | A | 203.1 | 227.4 | 10.68 |
| 2 | B | 203.1 | 227.8 | 13.03 |
| 3 | A | 217.2 | 228.2 | 4.82 |
| 3 | B | 217.2 | 228.7 | 5.02 |
| 4 | A | 206.3 | 247.6 | 16.68 |
| 4 | B | 206.3 | 252.7 | 18.36 |

* Viscosity is measured in centistokes at 100° Fahrenheit.

B. The test samples of part A were also tested to determine relative increase in acidity. Acid number measurements were made before and after subjecting the test samples to the described conditions with results as indicated in Table VI.

TABLE VI

| Batch | Sample | Initial Acidity | Terminal Acidity | % Change |
|---|---|---|---|---|
| 1 | A | 0.70 | 1.58 | 55.7 |
| 1 | B | 0.70 | 1.54 | 54.5 |
| 2 | A | 1.46 | 1.98 | 26.3 |
| 2 | B | 1.46 | 1.96 | 25.5 |
| 3 | A | 2.31 | 2.32 | 0.4 |
| 3 | B | 2.31 | 2.34 | 1.3 |
| 4 | A | 1.05 | 1.46 | 28.1 |
| 4 | B | 1.05 | 1.33 | 21.0 |

Since the additives are acidic themselves, the initial acid numbers are of no uncorrectable consequence but only the relative increase in acidity after subjection to severe conditions. To this end it is surprising to note that when 1% of the additive is mixed with the base stock, the change of acidity is comparable to present commercial additives and at 2% there is no appreciable change in acidity a significant improvement over the prior art.

C. Test samples were subjected to a carbon residue testing procedure to determine the amount of carbon residue formed during evaporation and pyrolysis thereof. This procedure is indicative of the amount of carbonaceous deposits a motor oil would form in the combustion chamber of an engine. Fresh samples from batch 1–4 were tested together with test samples which had previously been subjected to the severe conditions of Part A. Each sample was heated in a coking furnace at about 1020° Fahrenheit for about 20 minutes and the residue weighed to the nearest 0.1 mg. The results are as reported in Table VII.

TABLE VII

Carbon Residue Data

| Batch | Sample | Mg. of Residue Fresh Batch | Mg. of Residue Conditioned Samples | Increase |
|---|---|---|---|---|
| 1 | A | .090 | .350 | .260 |
| 1 | B | .092 | .350 | .258 |
| 2 | A | .082 | .140 | .058 |
| 2 | B | .082 | .140 | .058 |
| 3 | A | .093 | .128 | .035 |
| 3 | B | .093 | .130 | .037 |
| 4 | A | .210 | .320 | .110 |
| 4 | B | .210 | .310 | .100 |

As can be seen from the above the test samples containing the product of Example 26 additive substantially decreased the carbon forming tendency of the base oil.

EXAMPLE 53

The product of Example 28 was subjected to bearing corrosion bench testing to evaluate its effect upon crankcase lubricating oils for resistance to degradation to copper lead bearings as related to Federal test method 3405 of Federal test method Standard No. 791a. The procedure involves continuous operation of a bench apparatus under constant speed, at a lubricant temperature of 285° Fahrenheit, air humidity of 65 grains/lb. of dry air and an air flow rate of 780 ml/in. for 40 hours. The results are indicated in Table VIII.

TABLE VIII

| Sample | Starting Bearing Wt. in gms. | Ending Bearing Wt. in gms. | Weight Decrease |
|---|---|---|---|
| Pure Lube Base | 78.9369 | 76.5625 | 2.3744 |
| Lube Base Prod. of Ex. 28 | + 79.0472 | 77.1701 | 1.9771 |

As can be seen, there is an approximate 17% decrease in bearing degradation when the product of Example 28 is added to the lube Oil.

EXAMPLE 54

The additive product of Example 28 was diluted in a 1:1 ratio with light mineral oil and subjected to induction period testing to determine its ability to stabilize gasoline, under accelerated oxidation conditions, by the Induction Period Method ASTMD 525. The gasoline used in this evaluation was formulated from a commercially available refinery cut and consisted of a blend of 50% by volume saturates, 40% and 10% aromatics. The additive was blended into the gasoline at additive concentrations of 0.003 and 0.0045 percent by weight with results as indicated in Table IX.

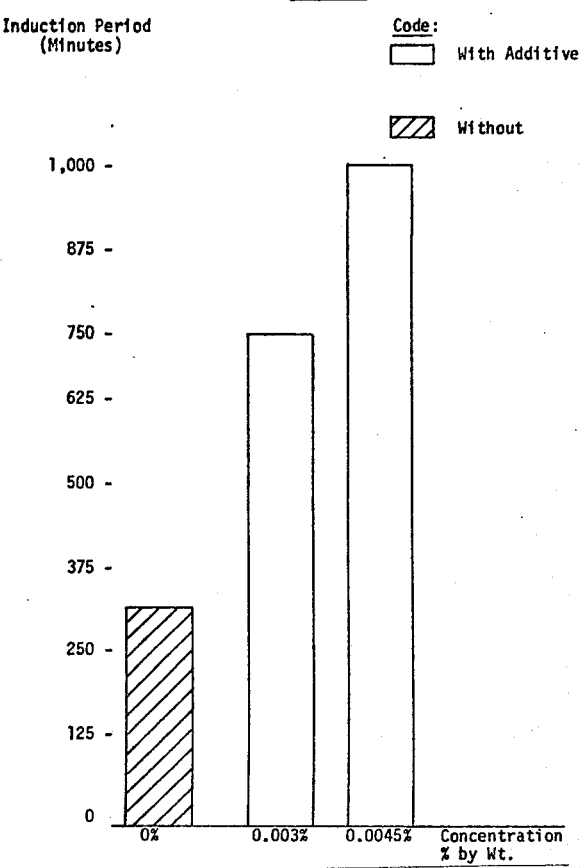

TABLE IX

EXAMPLE 55.

The product of Example 28 was tested to determine its effect as an additive inhibiting gasoline induction system deposits in the valve and port area of conventional automobile gasoline engines. The effect on two different gasoline formulations, containing varying concentrations of additive, was compared to the effect of varying concentrations of a commercially available additive, N,N' disecondary butyl para-phenylene diamine. The two gasolines used in this evaluation were formulated from commercially available refinery cuts Gasoline A consisting of 70% by volume saturates, 20% olefins and 10% aromatics; Gasoline B was blend of 50% by volume saturates, 40% olefins and 10% aromatics. Three additive concentrations were tested, 0.003%, 0.006% and 0.009% concentration by weight. The additives were diluted in a 1:1 ratio with a light mineral oil and thoroughly blended with the gasoline and equal measured quantities of each blend were vaporized in air by a carborator type mechanism and the so vaporized mixture impinged upon a metal object was maintained at a constant temperature equal to about the temperature of a combustion chamber in the standard automobile gasoline engine. The degree of vaporization, metal object and temperature thereof were maintained constant for each tested blend. Upon completion of each test, the weight of insoluble heptane deposits on the metal plate was determined. Table X illustrates the results of such testing.

TABLE X

Code:
- ⊕ - Prod. of Ex. 28 in Additive A
- ○ - Prod. of Ex. 28 in Additive B
- ▼ - Commercial Additive in Gasoline A
- ▽ - Commercial Additive in Gasoline B

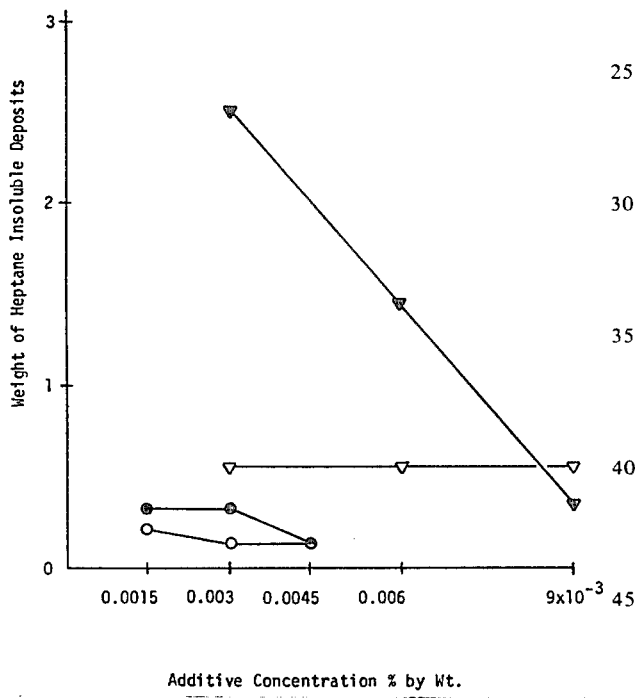

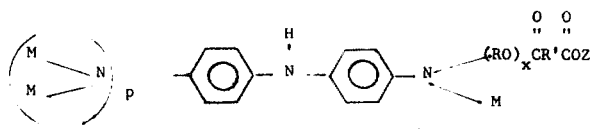

We Claim:
1. A method of inhibiting degradation of organic working fluids selected from the group consisting of natural and synthetic hydrocarbon and carboxylic acid ester oils and greases based thereon and hydrocarbon fuels, and substrates in contact therewith, which comprises incorporating into said organic working fluid an effective degradation inhibiting amount of a compound of the formula

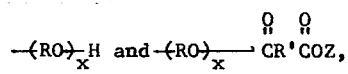

wherein $x$ is an integer from 1–12; Z is a member of the group consisting of H, and alkyl; R is a member selected from the group consisting of ethylene, 1,2-propylene, 1,2-butylene, 2,3-butylene, styrylene and mixture thereof, R' is selected from the group consisting of arylene, alkylene, alkenylene, cycloalkenylene and cycloalkylene containing at least two carbon atoms; M is a member individually selected from the group consisting of hydrocarbon of 1–18 carbon atoms,

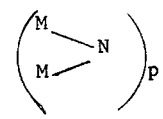

wherein R, $x$, R' and Z are as above defined; and $p$ is an integer from 0–1, providing when $p$ is 0, $$\left( \begin{matrix} M \\ | \\ M \end{matrix} \rangle N \right)_p$$

is hydrogen.
2. The method of claim 1 wherein $p$ is 0.
3. The method of claim 1 wherein R is ethylene.
4. The method of claim 1 wherein R is 1,2 propylene.
5. The method of claim 1 wherein R is styrylene.
6. The method of claim 1 wherein $p$ is 0 and M is hydrocarbon of 1–18 carbon atoms.
7. The method of claim 6 wherein said compound is of the formula

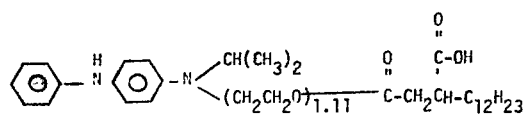

8. The method of claim 6 wherein said compound is of the formula:

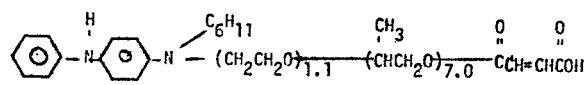

9. The method of claim 1 wherein $p$ is O and M is

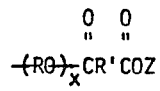

10. The method of claim 9 wherein said compound is of the formula

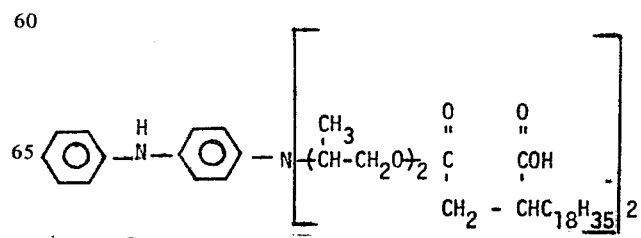

11. The method of claim 9 wherein said compound is of the formula

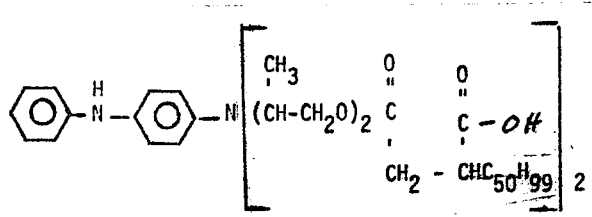

12. The method of claim 9 wherein said compound is of the formula

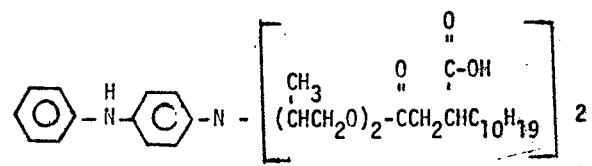

13. The method of claim 9 wherein said compound is of the formula

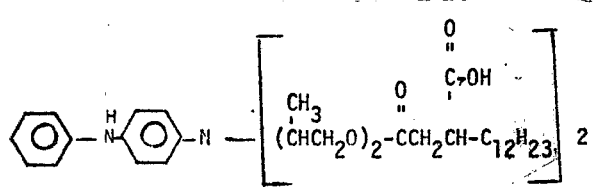

14. The method of claim 9 wherein said compound is of the formula

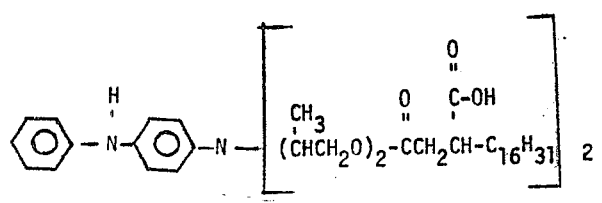

15. The method of claim 9 wherein said compound is of the formula

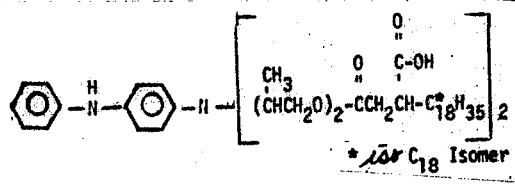

16. The method of claim 1 wherein M is $-RO-_rH$
17. The method of claim 1 wherein said organic working fluid is a petroleum fuel.
18. The method of claim 1 wherein said organic working fluid is petroleum oil.
19. The method of claim 1 wherein at least 0.0015% by weight of compound is impregnated into said organic working fluid.
20. The method of claim 6 wherein the compound is

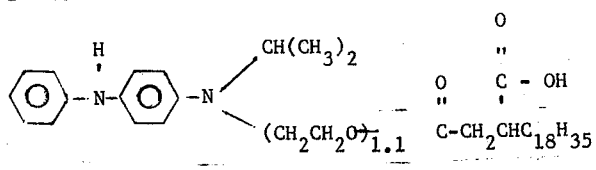

21. The method of claim 1 wherein the compound is

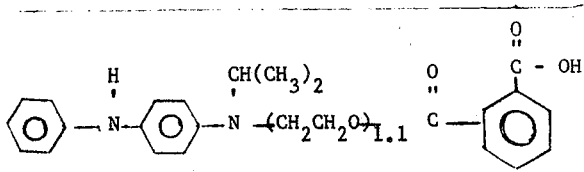

22. The method of claim 1 wherein the compound is

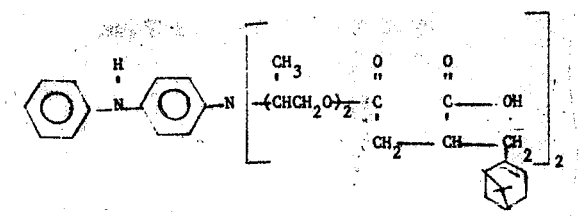

* * * * *